Nov. 30, 1943.   R. I. GEIGER   2,335,752
FISHING REEL
Filed Nov. 13, 1940   4 Sheets-Sheet 1
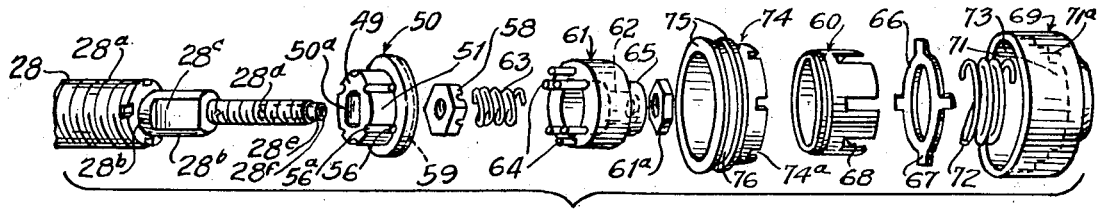
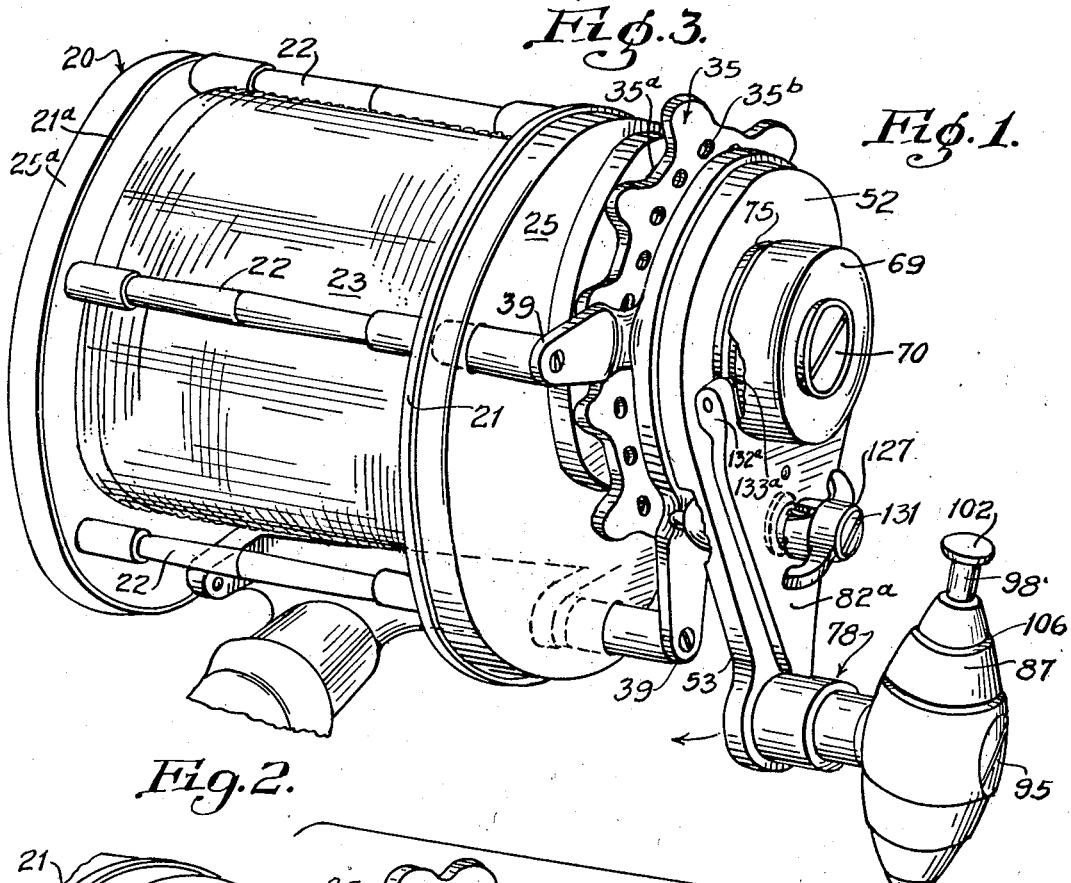
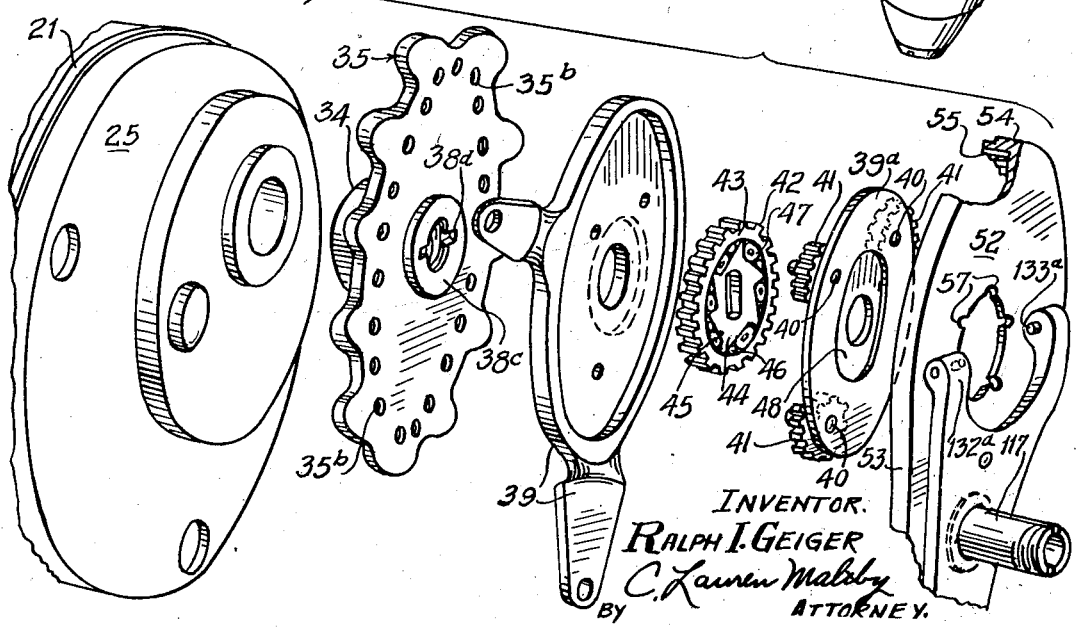
INVENTOR.
RALPH I. GEIGER

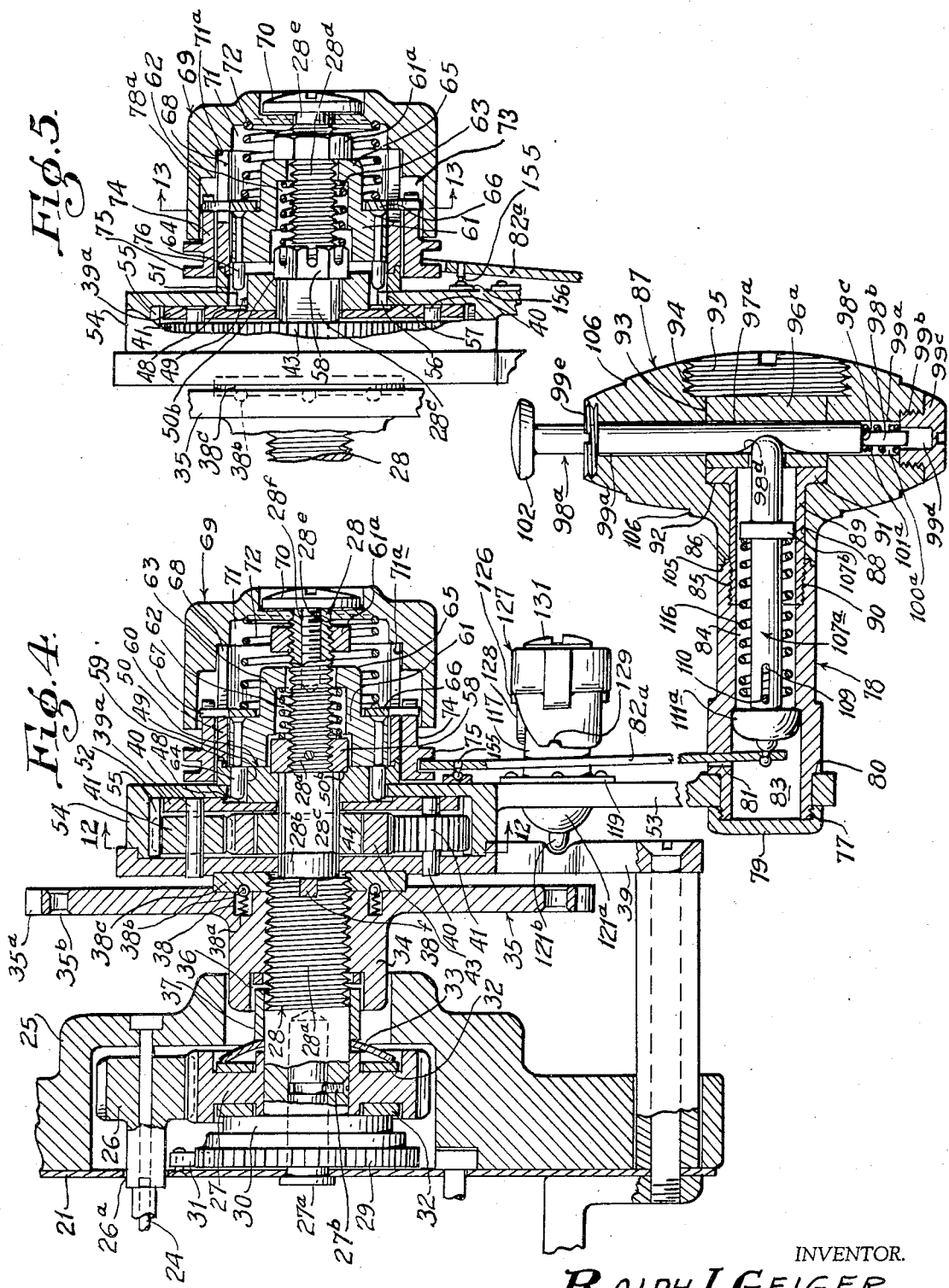

Nov. 30, 1943.  R. I. GEIGER  2,335,752
FISHING REEL
Filed Nov. 13, 1940   4 Sheets-Sheet 3
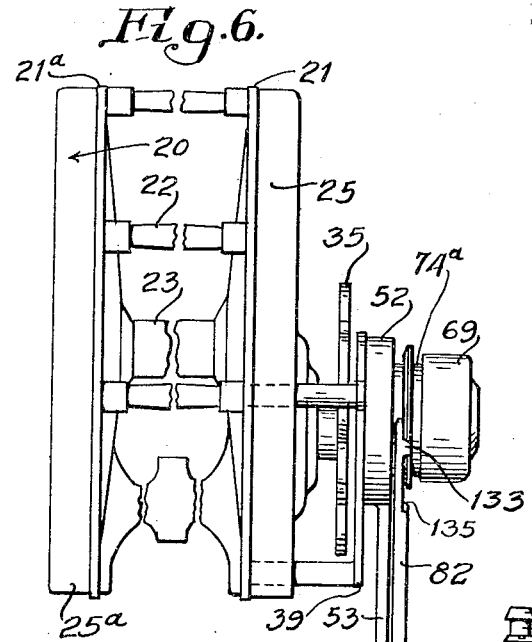
Fig. 6.
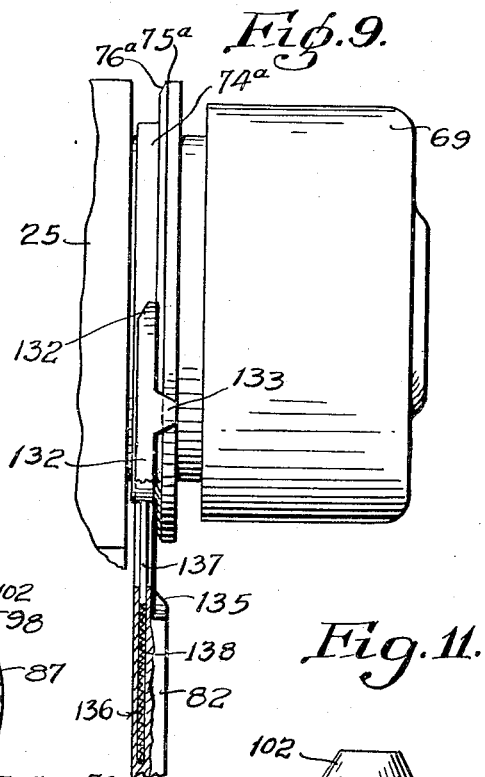
Fig. 9.
Fig. 11.
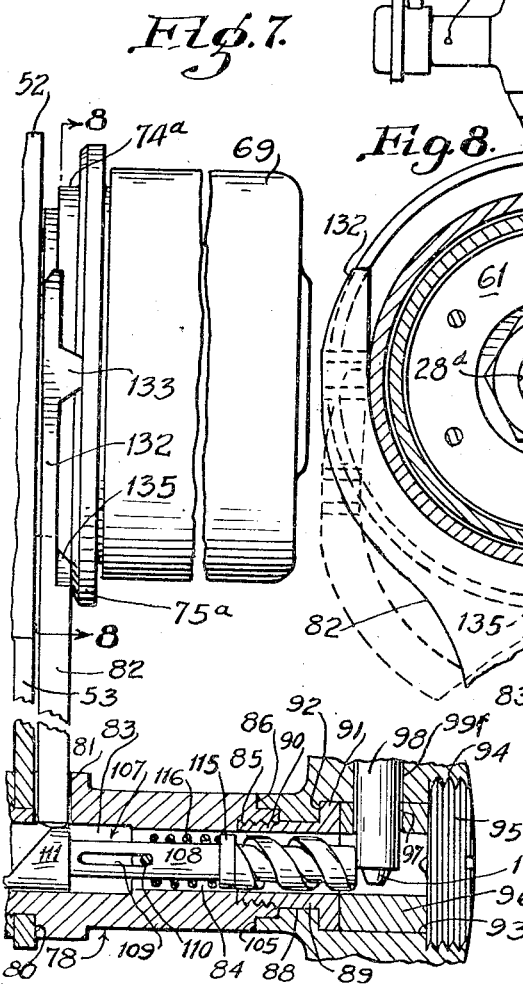
Fig. 7.
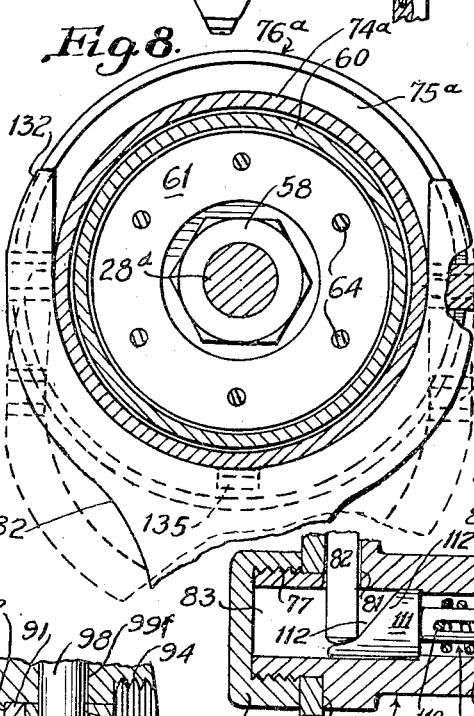
Fig. 8.
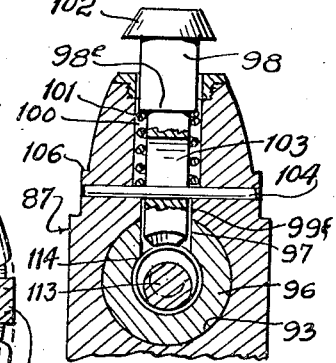
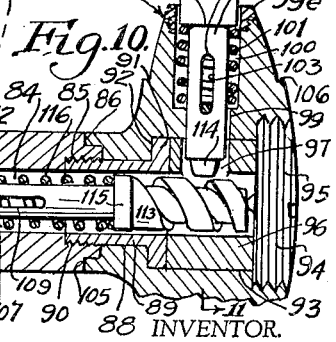
Fig. 10.
INVENTOR.
BY RALPH I. GEIGER
C. Lauren Maltby
ATTORNEY.

Nov. 30, 1943.   R. I. GEIGER   2,335,752
FISHING REEL
Filed Nov. 13, 1940   4 Sheets-Sheet 4
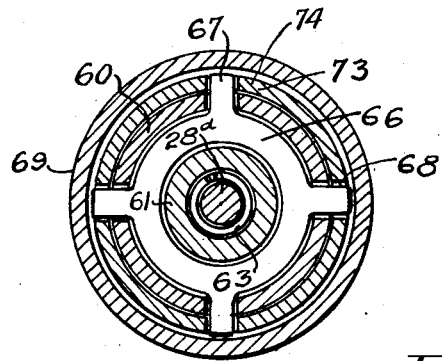
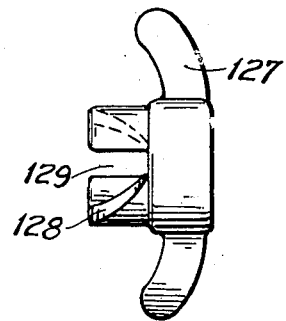
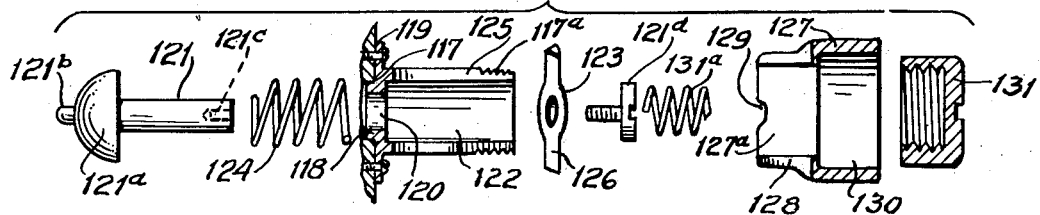
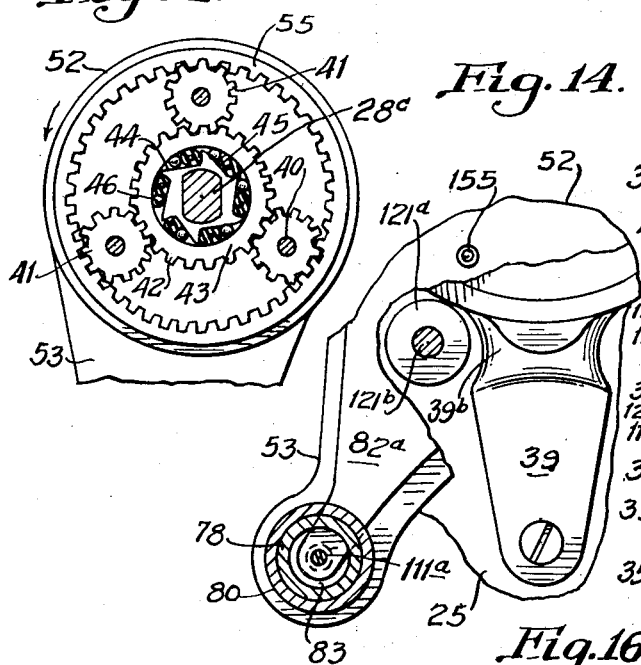
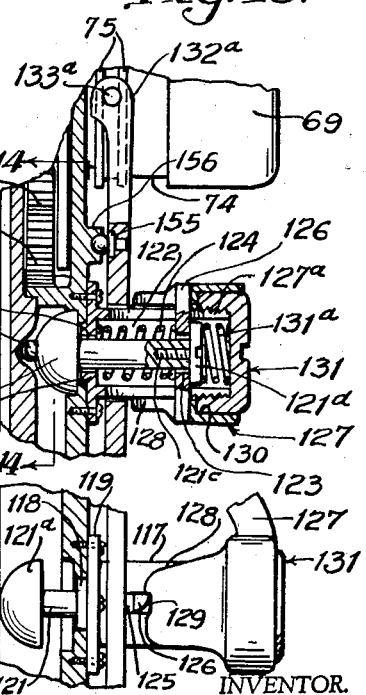
INVENTOR.
RALPH I. GEIGER
BY
C. Lauren Maltby
ATTORNEY.

Patented Nov. 30, 1943

2,335,752

UNITED STATES PATENT OFFICE 2,335,752

FISHING REEL

Ralph I. Geiger, Los Angeles, Calif.

Application November 13, 1940, Serial No. 365,565

13 Claims. (Cl. 242—84.7)

This invention relates to improvements in fishing reels and more especially to reels intended for deep sea fishing.

This case is a continuation-in-part of my application, Serial No. 323,279, filed March 11, 1940, which has become abandoned.

An object of the invention is to provide a simple, practical and efficient reel construction of the character described.

Another object is to provide a crank arm and drive shaft construction adapted for attachment to fishermen's reels having the usual star pilot or drag wheel, or the equivalent, where two speeds of the reel spool may be selectively obtained and the reel spool drag adjustment may be made from the crank arm knob without removal of the hand therefrom.

A further object of the invention is to provide for the adjustment of the star pilot or drag wheel in the usual manual manner or with the crank arm by rotation thereof in either the usual forward or novel backward direction, the drag adjustment control being actuated from the crank arm knob without removing the hand therefrom.

Another object is to provide means for adjustment of the reel spool drag while the line is being played out or reeled in without removal of the hand from the crank arm knob. A further object is to provide a reel crank arm and drive shaft construction wherein normal or high speed of the reel spool may be selectively effected without removal of the hand from the crank arm knob.

Another object is to provide the accomplishment of the foregoing objects by the manipulation of a radial plunger in the side of the crank arm knob by the thumb or finger without altering the normal grip of the hand on the knob, thereby minimizing unintentional or accidental change of the adjustments due to increased gripping of the crank arm knob as well as affording an easy, rapid manipulation while "working a hook up."

A further object is to provide a drive shaft construction, star pilot or drag wheel or the equivalent, crank arm and knob, adapted to replace the conventional star pilot or drag wheel and crank arm assembly for accomplishing the above objects.

Other objects and advantages will appear and be brought out more fully in the following specification, reference being had to the accompanying drawings, wherein:

Fig. 1 is a perspective view of a fishing reel showing the pilot or drag wheel and crank arm construction embodying my invention;

Fig. 2 is an exploded view showing the head plate, head cap, pilot or drag wheel, high speed over-drive and crank arm elements;

Fig. 3 is an exploded view showing the drive shaft and clutch assembly elements;

Fig. 4 is a sectional view taken through the drive shaft, pilot or drag wheel and crank arm showing the clutch in engaged position;

Fig. 5 is a fragmentary view partly in section showing the clutch parts in disengaged position;

Fig. 6 is a top view of a fishing reel and crank arm construction having a modified form of crank arm and knob and clutch operating mechanism;

Fig. 7 is an enlarged view partly in section showing the crank arm and knob shown in Fig. 6 and showing the clutch operating mechanism in disengaged position;

Fig. 8 is a sectional view taken along the line 8—8 of Fig. 7;

Fig. 9 is a view similar to Fig. 7 showing the clutch operating mechanism in engaged position;

Fig. 10 is a sectional view of the crank handle knob and spindle also shown in Fig. 7;

Fig. 11 is a sectional view taken along the line 11—11 of Fig. 10;

Fig. 12 is a cross section view taken along the line 12—12 of Fig. 4 showing the crank arm gears and overrunning drive for the shaft;

Fig. 13 is a sectional view taken along the line 13—13 of Fig. 5 showing a portion of the clutch operating mechanism;

Fig. 14 is a fragmentary sectional view taken along the line 14—14 of Fig. 15 showing one pinion gear housing member extension mounted on the reel frame, crank arm, yoke and spindle in section, pilot wheel engaging pin and lifting member.

Fig. 15 is a fragmentary view in section through the crank arm and pilot wheel engaging mechanism in disengaged position;

Fig. 16 is a fragmentary view partly in section showing the same in engaged position;

Fig. 17 is an exploded view showing the elements comprising the pilot wheel engaging mechanism; and Fig. 18 is a separate view showing the cam wing member also shown in Figs. 15, 16 and 17.

Referring more particularly to the drawings and especially to Figs. 1 to 5, inclusive, I show a fisherman's reel 20 having a head plate 21, a tail plate 21a, cross bars 22, and a spool 23 rotatably mounted on a bearing shaft 24 mounted between a head cap 25 and a tail cap 25a. A pinion gear 26 having a hub extension 26a is rotatably mounted on bearing shaft 24, hub extension 26a having means for engaging spool 23 as to turn therewith.

A driving gear 27 which meshes with pinion gear 26 has a bearing mounting on a drive shaft 28 but is free to rotate with respect thereto, shaft 28 having a bearing pin 27a in head plate 21 and being secured thereto by a set screw 27b in drive shaft 28. A ratchet 29 having a hub extension 30 is integrally secured to drive shaft 28, and a pawl 31 pivotally secured to head plate 21 engages ratchet 29 so as to permit rotation of shaft 28 in clockwise direction only as shown in Fig. 1. A pair of friction leather or composition drag washers 32 are mounted in recess portions of driving gear 27, one washer adapted to be pressed against hub 30 and the other against a metallic concave friction washer 33 on shaft 28.

Shaft 28 has a threaded portion 28a on which is mounted a threaded hub portion 34 of a star pilot or drag wheel 35, hub 34 having a recess 36 adapted to receive a portion of a thrust collar 37 on shaft 28 adapted to engage and compress washer 33 when star pilot wheel 35 is advanced by rotation along threaded portion 28a of the drive shaft. Star pilot wheel 35 has a plurality of finger grooves 35a and a plurality of apertures 35b for actuating the same. Apertures 35b are on a circle and equally distant from the drive shaft axis.

Shaft 28 has a reduced round portion 28b, a flat or key portion 28c, a reduced threaded portion 28d, a reduced round end portion 28e and a threaded end bore 28f. Pilot wheel 35 is provided with a plurality of bores 38, each containing a spring 38a and a pin 38b, pressing against a plurality of indentations in a threaded pilot wheel compensating washer 38c provided with a key notch 38d, in which is located a key 38f which engages a flat spot or key portion on portion 28a. A pinion gear housing member 39 is mounted on head plate 21 and has a bearing aperture for shaft portion 28b. Plate 39 and an auxiliary plate 39a have a plurality of bearing pins 40, each having a pinion gear 41 which meshes with a toothed annular portion 42 of an overrunning gear 43 having an inner clutch member 44 provided with a flattened or keyed aperture for engagement with flattened or key portion 28c of drive shaft 28 so as to turn therewith. Plate 39a has a drive shaft aperture.

Inner clutch member 44 has a plurality of cam surfaces 45, each provided with a roller or bearing ball 46 and a compression block 47 which engages the annular member 43 so as to provide an overrunning drive. Auxiliary plate 39a is provided with a recess 48, the central recess portion of which bears against the hub portion 49 of a locking pin drive shaft member 50 which is provided with a flattened or key aperture 50a for keyed connection with flattened or key portion 28c of the drive shaft.

Hub 49 has a circumferential portion 51 which forms a bearing for a bearing aperture of a crank handle plate 52 of a crank arm 53. Plate 52 has a cylindrical extension 54 provided with internal gear teeth 55 which mesh with pinion gears 41, and the inner side of plate 52 bears against the full width of pinion gear plate 39a. Member 50 is provided with a plurality of radially spaced apertures 56 which are bored on a circle so as to form semi-circular recesses 56a in circumferential portion 51 of hub portion 49. A plurality of semi-circular grooves 57, similar in number and spacing to apertures 56, are formed in the bearing aperture of crank arm plate member 52. Member 50 is provided with a recess 50b in its outer face for engagement with a lock nut 58 mounted on reduced threaded portion 28d of the drive shaft.

Member 50 is provided with a peripheral flange forming an annular recess 59 affording a bearing seat for a shouldered cylindrical pin collar housing 60. A pin collar 61 seats against recess 59 and is provided with a drive shaft aperture adapted to receive nut 58 and a reduced bore 62 for a spring 63 which bears against nut 58 and the internal base of bore 62. A plurality of spaced pins 64 are mounted in pin collar 61 and extend from the inner face thereof and are equal in number and spacing to apertures 56 in which they are adapted to reciprocate in drive shaft member 50.

Pin collar 61 has a reduced hub portion 65 on which a spring compression washer 66 is mounted, washer 66 having a plurality of radial extensions 67, each of which extends through an elongated slot 68 in pin collar housing 60. A pin collar housing cover 69 has a drive shaft aperture for rotatable mounting on drive shaft end portion 28e and a threaded lock screw 70 which seats in portion 28f retains cover 69 thereon. Housing cover 69 is provided with an internal recess 71 which forms a seat for a spring 72 which bears against washer 66. Cover 69 has an internal recess 71a which forms a seat for pin collar housing 60. Housing cover 69 is provided with a recess 73 to permit movement of extensions 67 of washer 66 therein when moved against spring 72 by a lifting collar 74. Collar 74 has a pair of flange portions 75 and has a central aperture for reciprocable mounting on pin collar housing 60. Flange portions 75 have an annular recess portion 76. Collar 74 has a plurality of guide slots 74a for extensions 67. A nut 61a is mounted on portion 28d and limits the movement of pin collar 61.

Crank arm 53 has an aperture to receive the reduced threaded portion 77 of a crank handle spindle 78 which is secured to the crank arm by a cap nut 79, a flange seat 80 being provided opposite side of crank handle 53 for seating spindle 78, flange 80 having a rectangular opening 81 adapted to receive the end of a yoke member 82a. Spindle 78 has an end bore 83, a reduced central bore 84, a threaded end bore 85, and a shoulder 86.

A crank handle knob 87 is provided with a bore 88 through which extends a flanged bushing 89 having a threaded end portion 90 by which it is secured to threaded portion 85 of spindle 78. Bushing 89 has a flanged portion 91 which seats against a shoulder 92 in an enlarged bore 93 in knob 87 by which the knob is held on spindle 78, however, is free to turn thereon and is provided with a shoulder 105 which engages shoulder 86 of spindle 78.

Bore 93 has a threaded enlarged portion 94 adapted to receive a cap screw 95. A cam member guide bushing 96a is positioned in bore 93 and has a cross bore 97a for a plunger 98a reciprocably mounted in a bore 99a extending through crank handle knob 87. Plunger 98a has a reduced end portion 98b forming a shoulder 98c which seats a spring 101a. A threaded cap 99c has a plunger bore 99d and also seats spring 101a. Plunger 98a has a cap 102. A threaded plunger bushing 99e is mounted on knob 87 and retains plunger 98a in bore 99a. Knob 87 may, if desired, be provided with a plurality of external grooves 106 by which an improved grip of crank handle knob may be effected.

A cam member 107a is mounted in spindle 78 and has a shank portion provided with an elongated slot 109 through which extends a pin 110 secured in spindle 78. A ball pivot member 111a is suitably secured to the end of member 107a in bore 83 and engages the end of yoke arm 82a which extends into bore 83. Plunger 98a has a cam surface 98d for engagement with the end of member 107a so as to reciprocate the latter in spindle 78 when plunger 98a is depressed. A flange 107b on member 107a seats one end of a spring 116, the other end of which seats against pin 110 so as to normally retain cam member 107a toward the knob end of the spindle.

A post 117 has a seating end portion 118 by which it is secured in an aperture in crank arm 53 and has a seating flange 119. Post 117 has a bore 120 for a star pilot wheel engaging pin 121 and an enlarged bore 122 to receive a spring 124 and a spring compression washer 123 slidably mounted on pin 121, spring 124 seats between compression washer 123 and the internal abutment of bore 122. Post 117 has a pair of side slots 125 for guide extensions 126 of spring compression washer 123. Pin 121 has a ball end cap portion 121a and a terminal bead 121b, also a threaded end bore 121c for a spring compression washer retaining cap screw 121d. A wing cam member 127 has a bore 127a to receive the end of post 117 and a pair of cam surfaces 128 for actuating spring compression washer extensions 126. Member 127 has a pair of dimples 129 for seating extensions 126 in the fully operated position, and is provided with an enlarged bore 130 adapted to receive a locking cap nut 131 which is secured on the threaded end portion 117a of post 117. Spring 131a seats between spring compression washer 40 cap screw 121d and inner surface of lock cap nut 131.

Yoke member 82a has a pair of yoke arms 132a which are each provided with a pin 133a, the pins being to engage recess 76 of lifting collar 74. Yoke member 82a is provided with a ball end fulcrum pin 155 which seats in a spherical seat member 156 on crank arm 53 in such manner that when yoke arm 82a is rocked toward crank arm 53 by the movement of cam member 107a and plunger 98a, collar 74 will be lifted, which will lift washer 66 and compress spring 72. Spring 63 will thereupon raise pin collar 61, thus retracting pins 64 from grooves 56a and 57, as will be more apparent hereinafter.

In Figs. 6 to 11 I showed a modified construction of the crank handle and knob and pin collar lifting mechanism. In these figures I show a yoke arm 82 reciprocably mounted on crank arm 53. A spindle 78 is provided having a bushing 89 which is secured in bore 93 of knob 87.

Bore 93 has a threaded enlarged portion 94 adapted to receive a cap screw 95. A cam member guide bushing 96 is positioned in bore 93 and has a side bore 97 for the end of a plunger 98 reciprocably mounted in a bore 99 in a radial portion of crank handle knob 87. Bore 99 has an enlarged spring seating portion 100 to receive a spring 101 which seats against a shoulder 98e on plunger 98. Plunger 98 has an elongated slot 103 through which extends a pin 104 inserted through the radial portion of knob 87. Knob 87 may, if desired, be provided with a plurality of external grooves 106 by which an improved grip of crank handle knob may be effected.

A cam member 107 is mounted in spindle 78 and has a shank portion 108 provided with an elongated slot 109 through which extends a pin 110 secured in spindle 78. A cam block 111 is suitably secured to the end of shank 108 in bore 83 and has an inclined cam surface 112 for engagement with the end of yoke arm 82 which extends into bore 83. Shank 108 has a sharp pitched worm screw thread 113 adapted to be engaged by the reduced end 114 of plunger 98 forming substantially full thread engagement therewith. A collar 115 is secured on shank 108 and seats one end of a spring 116, the other end of which seats against pin 110 so as to normally retain cam member 107 toward the knob end of the spindle.

Yoke member 82 has a pair of yoke arms 132 which are adapted to slide under flange portion 75a of a lifting collar 74a. The yoke arms 132 are each provided with a pair of cam surfaces 133 and adapted to engage beveled portion 76a and move under flange portion 75a and raise lifting collar 74a. Member 82 is further provided with a cam surface 135 positioned centrally which is adapted to function along with yoke arms 132 to raise lifting collar 74a.

Yoke member 82 is provided with an end bore 136 adapted to receive a thrust pin 137 which bears against the cylindrical surface of drive shaft member 50. A spring 138 is positioned in bore 136 and bears against the base thereof and against one end of thrust pin 137. Spring 138 serves to return yoke member 82 after being actuated forwardly by cam member 107.

The operation of the invention should be clear from the foregoing description. As stated above, the reel spool 23 on shaft 24 is rotationally free whenever thrust collar 37 is in a retracted position since friction washers 32 will be loose and gear 27, which drives gear 26 on shaft 24, is loose on shaft 28. Washers 32, recessed portions of driving gear 27 and hub 30 will be compressed when collar 37 is advanced by right hand rotation of star pilot or drag wheel 35 on threaded portion 28a of shaft 28. Star pilot wheel 35 may be turned in either direction by hand or by pin 121 on crank arm 53 when crank arm 53 is free to rotate by disengagement of clutch, as will be more fully explained hereinafter.

When cam wing member 127 is turned a quarter turn to the right, cam surfaces 128 engage extensions 126 on washer 123, causing the washer to compress spring 124 and permits spring 131a to advance 121, causing terminal bead 121b and causing cap portion 121a and terminal 121b to engage one of the apertures 35b in star pilot wheel 35. Thus the rotation of crank handle 53 will turn pilot wheel 35 which can be turned in either direction to increase or decrease the compression of washers 32 and gear 27 and hub 30. Since pilot wheel 35 is below and crank arm 53 is above plate 39, cap portion 121a and bead 121b must be retracted as they pass over the arm extensions of plate 39 and the latter are provided with chamfered grooves 39b to permit portions 121a and bead 121b to ride over the arm extensions and engage the next successive aperture 35b. Upon the engagement of the drive shaft mechanism by the release of plunger 98 or 98a, pilot wheel 35 and crank arm 53 turn together and it is not necessary to immediately turn cam wing member 127 back to cause a retraction of pin 121; however, this can be done whenever the operator desires without removal of the hand from crank handle knob by the thumb or finger.

Fig. 4 shows crank arm 53 direct connected to shaft 28 by the engagement of the clutch mechanism wherein pins 64 are in recesses 56 of hub member 50 and recesses 57 in the shaft aperture of crank plate 52, hub 50 being keyed to shaft portion 28c. Shaft 28 can only be rotated clockwise since pawl 31 engages ratchet 29. Therefore spool 23 can only be rotated counter-clockwise from shaft 28 when thrust collar 37 compresses washers 32 on gear 27 and hub 30 of ratchet 29 integral on shaft 28. When the clutch is disengaged as shown in Fig. 5 and pins 64 retracted from grooves 56 and 57, crank plate 52 and crank arm 53 are rotatable in either direction on hub portion 51 of member 50 and the rotation counter-clockwise of crank arm 53 and gears 55 of plate 52 drives gears 41, which in turn drives gear 43 which turns shaft 28 clockwise at a higher than crank arm speed, as determined by the ratio of the number of gear teeth 55 and 42 respectively, gear 43 having an over-running clutch connection with member 44 which is keyed on shaft portion 28c and the rotation clockwise of plate 52 and crank arm 53 will not rotate shaft 28 since pawl 31 engages ratchet 29 and member 44 keyed on drive shaft portion 28c runs free with respect to over-running gear 43, thus crank arm 53 is free to rotate clockwise the star pilot or drag wheel 35 when cam wing nut member 127 has been actuated to depress pin 121 into engagement with apertures 35b in star pilot or drag wheel 35.

The crank plate 52 and crank arm 53 clutch mechanism is caused to be disengaged by depression of plunger 98 or 98a which reciprocates cam member 107 or 107a, which shifts yoke arm 82 or rocks yoke arm 82a and lifts collar 74 or 74a which in turn lifts washer 66, compressing spring 72, thus permitting pin collar 61 to be raised by spring 63 and retracting pins 64 from grooves 56 and 57.

Having described my invention, what I claim is:

1. In a fisherman's reel, as described, having a reel spool, a drive shaft, gear connected thereto, having a friction clutch connection to rotate said reel spool in one direction, a crank arm having a clutch and over-running gear connection with said drive shaft adapted for direct connection when said clutch is in engaged position whereby to turn said shaft at normal speed and adapted when said clutch is in disengaged position to drive said shaft through said gear connection at a higher speed by rotation of the crank arm in the opposite direction, there being no driving of said shaft by said crank arm when rotated in said original direction when said clutch is in disengaged position.

2. In a fisherman's reel, as described, having a reel spool, a drive shaft, gear connected thereto, having a friction clutch connection to rotate said reel spool in one direction and an adjustable star pilot or drag wheel, a crank arm having a clutch and over-running gear connection with said drive shaft such that when said clutch is in engaged position said shaft will be turned at normal speed by said crank arm and adapted when said clutch is in disengaged position to drive said shaft through said gear connection at a higher speed by rotation of crank arm in the opposite direction, there being no driving of said shaft by said crank arm when rotated in said original direction when said clutch is in disengaged position, and means mounted on said crank arm adapted to engage said star pilot or drag wheel to increase the drag when said crank arm is rotated in said original direction and said clutch is in disengaged position.

3. In a fisherman's reel, as described, having a reel spool, a drive shaft, gear connected thereto, having a friction clutch connection to rotate said reel spool in one direction and an adjustable star pilot or drag wheel, a crank arm having a clutch and over-running gear connection with said drive shaft such that when said clutch is in engaged position said shaft will be turned at normal speed by said crank arm, and adapted when said clutch is in disengaged position to drive said shaft through said gear connection at a higher speed by rotation of crank arm in the opposite direction, and means mounted on said crank arm adapted to engage said star pilot or drag wheel to reduce the drag when said crank arm is rotated in the opposite direction and said clutch is in disengaged position.

4. In a fisherman's reel, as described, having a reel spool, a drive shaft, gear connected thereto, having a friction clutch connection to rotate said reel spool in one direction, said reel having a head plate, a pinion gear housing member mounted on said head plate in spaced relation thereto and having an arm extensions and a drive shaft aperture, a reel crank arm having a clutch connection with said shaft, whereby to turn said shaft at normal speed when said clutch is in engaged position, said housing member having a plurality of idler gears, said crank arm having a plate portion provided with a drive gear for said idler gears, whereby to turn said shaft at a higher speed by rotation of said crank arm in the opposite direction when said clutch is in disengaged position, a crank arm knob on said crank arm having a thumb operated plunger, a lifting collar on said shaft adapted to actuate said clutch, a lever on said crank arm adapted to lift said clutch collar and means adapted to rock said lever when said crank arm knob plunger is depressed to disengage said clutch.

5. In a fisherman's reel, as described, having a reel spool, a drive shaft, gear connected thereto, having a friction clutch connection to rotate said reel spool in one direction, said reel having a head plate, a pinion gear housing member mounted on said head plate in spaced relation thereto and having arm extensions and a drive shaft aperture, a reel crank arm having a clutch with said shaft, whereby to turn said shaft at normal speed when said clutch is in engaged position, said shaft having an over-running gear, said pinion gear housing member having a plurality of idler gears, said crank arm having a plate portion provided with a drive gear for said idler gears, whereby to turn said shaft at a higher speed by rotation of said crank arm in the opposite direction when said clutch is in disengaged position, a lifting collar on said shaft adapted to actuate said clutch, a yoke arm slidably mounted on said crank arm having cam portions adapted for lifting said collar, a spindle on said crank arm having a reciprocable cam member adapted to engage the end of said yoke arm and having a threaded end portion, a crank arm knob rotatably mounted on said spindle having a thumb actuated plunger provided with an end portion adapted to engage said threaded end portion of said cam member, said plunger adapted when said crank arm is turned to reciprocate said cam member to shift said yoke arm to disengage said clutch.

6. In a fisherman's reel, as described, having a reel spool, a drive shaft, gear connected thereto, having a friction clutch connection to rotate said reel spool in one direction, said reel having a head plate, a pinion gear housing member mounted on said head plate in spaced relation thereto and having arm extensions and a drive shaft aperture, a star pilot or drag wheel rotatably mounted on said shaft between said head plate and gear housing member, a reel crank arm having a clutch and over-running gear connection with said shaft whereby to turn said shaft at normal speed when said clutch is in engaged position, said shaft having an over-running gear, said pinion gear housing member having a plurality of idler gears, said crank arm having a plate portion provided with a drive gear for said idler gears, whereby to turn said shaft at a higher speed by rotation of said crank arm in the opposite direction when said clutch is in disengaged position and means mounted on said crank arm adapted to selectively engage said star pilot or drag wheel for rotation thereof on said shaft by said crank arm when said clutch is in disengaged position.

7. In a fisherman's reel, as described, having a reel spool, a drive shaft, gear connected thereto, having a friction clutch connection to rotate said reel spool in one direction, said shaft being provided with a manually adjustable star pilot or drag wheel, a reel crank arm for said shaft adapted to rotate in either direction and having means to change the adjustment of said star pilot or drag wheel by said rotation in either direction, said shaft having an adjustably positioned star pilot or drag wheel limiting member.

8. In a fisherman's reel, as described, having a reel spool, a drive shaft, gear connected thereto, having a friction clutch connection to rotate said reel spool in one direction, said shaft being provided with an externally mounted manually adjustable star pilot or drag wheel, a reel crank arm for said shaft adapted to rotate in either direction, and means adapted to selectively engage said star pilot or drag wheel so as to revolve said star pilot or drag wheel simultaneously with said crank handle.

9. In a fisherman's reel, as described, having a reel spool, a drive shaft, gear connected thereto, having a friction clutch connection to rotate said reel spool in one direction, said reel having a head plate, a pinion gear housing member mounted on said head plate in spaced relation thereto and having arm extensions, a star pilot or drag wheel rotatably mounted on said shaft between said head plate and said gear housing member, a reel crank arm having a clutch connection with said shaft and having a plate portion provided with an internal gear, an over-running gear on said shaft, said pinion gear housing member having a plurality of idler gears engaging said internal and over-running gears, a crank arm knob on said crank arm having a thumb actuated plunger in a radial portion thereof, means on said crank arm adapted to be actuated by said plunger to disengage said clutch when said plunger is depressed and means on said crank arm adapted to be actuated by the thumb or finger without removal of the hand from said crank arm knob to selectively engage said star pilot or drag wheel so as to turn the same with said crank arm when said clutch is in disengaged position.

10. In a fisherman's reel, as described, having a reel spool, a drive shaft, gear connected thereto, having a friction clutch connection to rotate said reel spool in one direction, said reel having a head plate, a pinion gear housing member mounted on said head plate in spaced relation thereto and having arm extensions, a star pilot or drag wheel rotatably mounted on said shaft between said head plate and said gear housing member, a reel crank arm having a clutch connection with said shaft and having a plate portion provided with an internal gear, an over-running gear on said shaft, said pinion gear housing member having a plurality of idler gears engaging said internal and over-running gears, a crank arm knob on said crank arm having a thumb actuated plunger in a radial portion thereof, means on said crank arm adapted to be actuated by said plunger to disengage said clutch when said plunger is depressed and means on said crank arm adapted to be actuated by the thumb or finger without removal of the hand from said crank arm knob to engage said star pilot or drag wheel so as to turn the same with said crank arm when said clutch is in disengaged position, said star pilot or drag wheel having a plurality of apertures adapted to be engaged by said last means, said last means including a pin transversely reciprocable on said crank arm having a terminal portion adapted to engage said apertures, spring means adapted to shift said pin for engagement with said apertures and a spring seated rotatable cam wing member adapted to retain said pin out of engagement with said said apertures.

11. In fisherman's reel, as described, having a reel spool and a drive shaft, gear connected thereto, having a friction clutch connection to rotate said reel spool in one direction, said reel having a head plate, a pinion gear housing member having arm extensions for mounting on said head plate, said arm extensions for mounting on said head plate, said arm extensions each having chamfered groove, a star pilot or drag wheel rotatably mounted on said shaft between said head plate and said gear housing member, a reel crank arm having a clutch connection with said shaft and having a plate portion provided with an internal gear, an over-running gear on said shaft, said pinion gear housing member having a plurality of idler gears engaging said internal and over-running gears, a crank arm knob on said crank arm having a thumb actuated plunger in a radial portion thereof, means on said crank arm adapted to be actuated by said plunger to disengage said clutch when said plunger is depressed and means on said crank arm adapted to be actuated by the thumb or finger without removal of the hand from said crank arm knob to engage said star pilot or drag wheel so as to turn the same with said crank arm when said clutch is in disengaged position, such that when said clutch is in engaged position said shaft will be turned at normal speed by said crank arm, said last means including a pin transversely reciprocable on said crank arm having a terminal portion adapted to engage said apertures, spring means adapted to shift said pin for engagement with said apertures and a spring seated rotatable cam wing member adapted to retain said pin out of engagement with said apertures, said pin being automatically retractable so as to over-ride said chamfered arm extension grooves when said crank arm is rotated and said pin is in condition for engagement with said apertures.

12. A two-speed drive for a fisherman's reel, as described, having a rotatable drive shaft adapted to be rotated in one direction comprising a crank arm for said shaft, a locking pin member having keyed connection to said shaft and having a hub portion provided with a plurality of grooves, said crank arm having a plate portion provided with a grooved bearing aperture for said locking pin member hub and an internal gear, an over-running gear mounted on said shaft, a stationary plate member, a plurality of idler gears having bearing mounting on said plate member adapted to engage said internal and over-running gears, a pin collar reciprocably mounted on said shaft and having a plurality of pins adapted to be retractably positioned into and out of said grooves, spring means on said shaft adapted to bias said pin collar so as to retract said pins from said grooves, a washer on said pin collar member, spring means of greater strength than first spring means mounted on said shaft adapted to engage said washer and bias said pin collar to cause said pins to enter said grooves, a lifting collar for said washer and manually actuated means on said crank arm adapted to lift said collar to compress said second spring means and permit said first spring means to cause said pin collar to be retracted.

13. A two-speed drive for a fisherman's reel, as described, having a rotatable drive shaft adapted to be rotated in one direction comprising a crank arm for said shaft, having a clutch connection with said shaft so as to turn therewith when said clutch is in engaged position and having a plate portion provided with an internal gear, a stationary gear housing member having bearing mounting for a plurality of idler gears, a gear on said shaft adapted to be driven by said idler gears and having a bearing bore, a cam member keyed to said shaft having plurality of rollers and compression blocks in said bore adapted to engage the cam portions of said cam member to effect a one-way drive of said shaft by said gear whereby to turn said shaft at a higher speed by said crank arm when rotated in the opposite direction through said gears when said clutch is in disengaged position.

RALPH I. GEIGER.